United States Patent
Huang et al.

(10) Patent No.: US 9,916,405 B2
(45) Date of Patent: Mar. 13, 2018

(54) DISTRIBUTED TIMING ANALYSIS OF A PARTITIONED INTEGRATED CIRCUIT DESIGN

(71) Applicant: International Business Machines Corporation, Armonk, NY (US)

(72) Inventors: Tsung-Wei Huang, Savoy, IL (US); Kerim Kalafala, Rhinebeck, NY (US); Debjit Sinha, Wappingers Falls, NY (US); Natesan Venkateswaran, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/049,501

(22) Filed: Feb. 22, 2016

(65) Prior Publication Data
US 2017/0242945 A1    Aug. 24, 2017

(51) Int. Cl.
*G06F 17/50*    (2006.01)

(52) U.S. Cl.
CPC ...... *G06F 17/5031* (2013.01); *G06F 17/5022* (2013.01); *G06F 17/5045* (2013.01); *G06F 2217/84* (2013.01)

(58) Field of Classification Search
CPC ............. G06F 17/5031; G06F 17/5022; G06F 17/5045; G06F 2217/84
USPC .................. 716/100, 104–106, 108, 132, 134
See application file for complete search history.

(56) References Cited

U.S. PATENT DOCUMENTS

| | | | |
|---|---|---|---|
| 5,615,127 A | 3/1997 | Beatty et al. | |
| 5,909,681 A * | 6/1999 | Passera | G06F 9/5027 |
| 6,484,397 B1 * | 11/2002 | Collins | B23P 19/04 |
| | | | 29/515 |
| 6,557,151 B1 | 4/2003 | Donath et al. | |
| 6,732,141 B2 * | 5/2004 | Ellis | G06F 9/5072 |
| | | | 709/201 |
| 7,131,085 B2 * | 10/2006 | Farkash | G06F 17/504 |
| | | | 716/103 |
| 7,234,126 B2 * | 6/2007 | Catthoor | G06F 17/5045 |
| | | | 716/104 |

(Continued)

OTHER PUBLICATIONS

Holder et al., "Prototype for a large-scale static timing analyzer running on an IBM Blue Gene", Proc. of IPDPS 2010, pp. 1-9.

*Primary Examiner* — Stacy Whitmore
(74) *Attorney, Agent, or Firm* — Cantor Colburn LLP

(57) ABSTRACT

A method, system, and computer program product perform distributed timing analysis of an integrated circuit design. Aspects include dividing the integrated circuit design into non-overlapping design partitions, each design partition including nodes and edges, each edge interconnecting a pair of the nodes. Aspects also include identifying speculative nodes among the nodes, each speculative node having at least one and less than all timing inputs available and being associated with a speculative processing task, and identifying non-speculative nodes among the nodes, each non-speculative node having all timing inputs available and being associated with a non-speculative processing task. Assigning each of the non-speculative processing tasks to a respective processor of a processing system specific to each design partition for timing analysis processing is done prior to assigning any of the speculative processing tasks.

20 Claims, 5 Drawing Sheets

(56) References Cited

U.S. PATENT DOCUMENTS

| | | | | |
|---|---|---|---|---|
| 7,849,429 B2* | 12/2010 | Hemmett | ............ | G06F 17/5031 |
| | | | | 716/113 |
| 8,381,150 B2* | 2/2013 | Zolotov | ................... | G06F 8/20 |
| | | | | 716/103 |
| 8,612,911 B2* | 12/2013 | Buechner | ............ | G06F 17/5022 |
| | | | | 716/106 |
| 8,775,988 B2* | 7/2014 | Lavin | .................... | G06F 17/504 |
| | | | | 716/104 |
| 9,529,952 B1* | 12/2016 | Gamsa | .................. | G06F 17/505 |
| 2007/0245273 A1* | 10/2007 | Catthoor | ............. | G06F 17/5045 |
| | | | | 716/108 |
| 2009/0241078 A1* | 9/2009 | Hemmett | ............ | G06F 17/5031 |
| | | | | 716/113 |
| 2013/0290919 A1* | 10/2013 | Narayanaswamy | | G06F 17/5009 |
| | | | | 716/106 |
| 2015/0127926 A1* | 5/2015 | Koehl | .................. | G06F 9/3855 |
| | | | | 712/217 |
| 2016/0154905 A1* | 6/2016 | Beerel | .................... | H03K 3/037 |
| | | | | 716/104 |

\* cited by examiner

DISTRIBUTED TIMING ANALYSIS OF A PARTITIONED INTEGRATED CIRCUIT DESIGN

BACKGROUND

The present invention relates to static timing analysis, and more specifically, to distributed timing analysis of a partitioned integrated circuit (IC) design.

Timing analysis is an important aspect of digital IC design or chip design. Timing analysis refers to analyzing the delay through each portion of the chip design to determine whether or not the timing requirements of the design are met. Timing analysis may be repeated at various stages of the design. A chip design is modeled as a timing graph with gate- and wire-pins denoted by timing nodes. Each connection from an input pin (source node) to an output pin (sink node) is denoted by a directed timing edge in the graph. Generally, timing analysis involves calculating delay through all the edges or paths between every chip source node and every chip sink node. The delay facilitates the determination of an arrival time of a signal to each node. Generally, arrival time at a given node is determined as a sum of the arrival time at the output of the previous node (i.e., at the input of the edge between the two nodes) and a delay through that edge. Arrival time at any node refers to the time at which the voltage at the node input reaches some part (e.g., half) of the maximum voltage value. Thus, another value of interest for each node is the slew, which indicates a transition rate of the voltage. A variety of known tests (e.g., setup test, hold test) may be implemented as part of the timing analysis.

SUMMARY

According to an embodiment of the present invention, a method of performing distributed timing analysis of an integrated circuit design includes dividing the integrated circuit design into non-overlapping design partitions, each design partition including nodes and edges, each edge interconnecting a pair of the nodes; identifying, for each design partition, using a respective processing system specific to the design partition, speculative nodes among the nodes, each speculative node have one or more timing inputs available and one or more timing inputs not available and being associated with a speculative parallel processing task; identifying, for each design partition, using the respective processing system specific to the design partition, non-speculative nodes among the nodes, each non-speculative node having all timing inputs available and being associated with a non-speculative parallel processing task; and assigning each of the non-speculative processing tasks to a respective processor of the processing system specific to each design partition for timing analysis processing prior to assigning any of the speculative processing tasks.

According to another embodiment, a system to perform timing analysis of a design partition of an integrated circuit design includes a memory device configured to store the design partition of the integrated circuit design, a plurality of the design partitions representing non-overlapping portions of the integrated circuit design and the design partition including nodes and edges, each edge interconnecting a pair of nodes; and one or more processors configured to identify speculative nodes among the nodes, each speculative node have one or more timing inputs available and one or more timing inputs not available and being associated with a speculative processing task, identify non-speculative nodes among the nodes, each non-speculative node having all timing inputs available and being associated with a non-speculative processing task, and perform timing analysis of the non-speculative processing task prior to performing timing analysis of any of the speculative processing tasks, wherein each of the one or more processors processes one of the speculative processing tasks or one of the non-speculative processing tasks at a time.

A computer program product for performing timing analysis of a design partition of an integrated circuit design, the design partition representing a portion of the integrated circuit design and including nodes and edges, each edge interconnecting a pair of the nodes includes a computer readable storage medium having program instructions embodied therewith. The program instructions executable by a processor to perform a method including identifying speculative nodes among the nodes, each speculative node having one or more timing inputs available and one or more timing inputs not available and being associated with a speculative processing thread; identifying non-speculative nodes among the nodes, each non-speculative node having all timing inputs available and being associated with a non-speculative processing task; and assigning each of the non-speculative processing tasks to a respective processor of the processing system specific to each design partition for timing analysis processing prior to assigning any of the speculative processing tasks.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
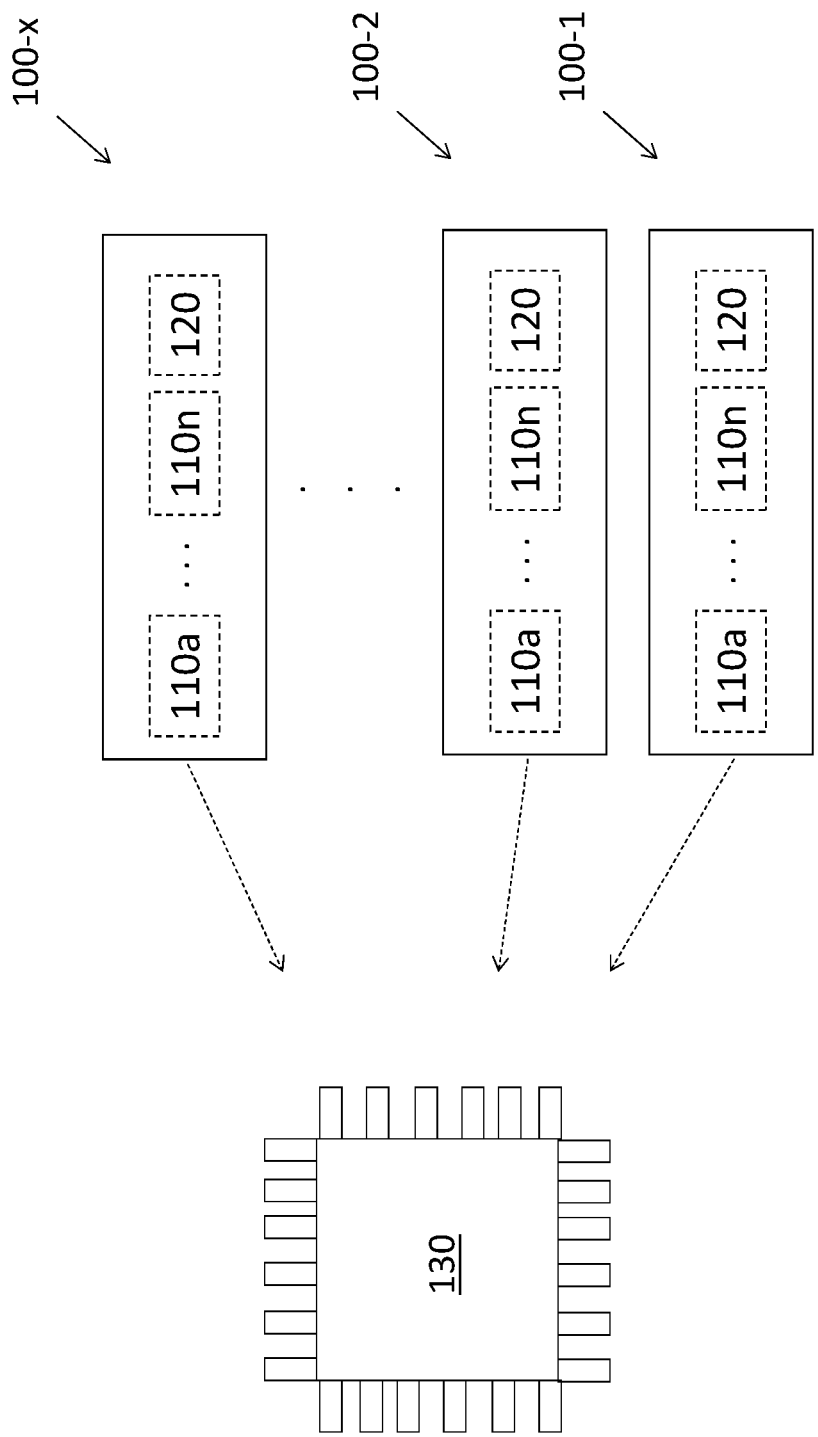
FIG. 1 is a block diagram of a set of processing systems that perform distributed timing analysis of a chip design for a single corner according to embodiments.

As noted above, timing analysis is an important part of ensuring that a chip design meets timing requirements and, thus, may be performed at various stages of design. Timing analysis includes computing, for example, the arrival time, slew, and required arrival time at each node. Slew values may refer to both rising and falling transitions of the voltage (e.g., the time to transition from 10% to 90% of the maximum voltage value and the time to transition from 90% to 10% of the maximum voltage value). As noted above, calculating delay through an edge between two nodes facilitates the determination of an arrival time of a signal at the input of the downstream node as the sum of the arrival time at the output of the upstream node (i.e., input of the edge) and delay through the edge. The delay through a node or an edge is generally not a fixed value. Instead, a range of delay values may be indicated by a minimum and maximum delay.

That is, even with known upstream inputs, the delay may be given by a range of values because of process and environmental variations, for example. Thus early and late mode values corresponding with the minimum and maximum delay values (and, subsequently, early and late mode arrival times) may generally be used rather than fixed values. Required arrival time is driven by the design specification and may be back-propagated to upstream nodes. Thus, timing analysis may be done in both the forward and reverse directions through a chip design.

An aspect of performing comprehensive timing analysis is testing timing for different on-chip and environmental (e.g., temperature, battery level) variations. Each particular set of variables is referred to as a corner. As circuit complexities increase, performing timing analysis for a design for multiple corners has become computationally intensive. Distributed timing analysis (DTA) refers to dispersing the processing tasks to multiple machines and can be implemented in a number of ways. For example, the entire chip design may be replicated on different machines, and each machine may perform timing analysis for a specific corner. This approach does not address the increased complexity and size of the design itself. As another example, the chip design may be partitioned on multiple machines such that each partition is processed by the multiple machines. However, as noted above, timing analysis requires propagating the arrival time (earliest and latest possible switching times) from the source nodes to the sink nodes of the entire chip, and similarly back-propagating required arrival time (bounds on switching times required to ensure that all downstream timing constraints are met) values Thus, one portion of the design provides the inputs to subsequent portions of the design. Inputs refer to the values needed to analyze timing of one node-at-a-time (e.g., arrival time at the input of the node and delay through the node are needed to determine arrival time at the output of the node). Inputs may mean an upstream delay through an edge, which is used to determine an arrival time value at a node, or a downstream delay through an edge, which is used to determine a required arrival time at a node, for example. This sequential aspect of timing analysis complicates the distributed analysis of the design when the design itself is partitioned (as opposed to analysis of different corners being distributed). Specifically, completing timing analysis in an efficient manner that does not require the processing of each portion of the design to wait for completion of the previous portions of design is not straightforward. Embodiments of the systems and methods detailed herein relate to distributed timing analysis based on partitioning the design over multiple machines. A balance of speculative and non-speculative processing is used to efficiently complete the timing analysis.

Figure 5:
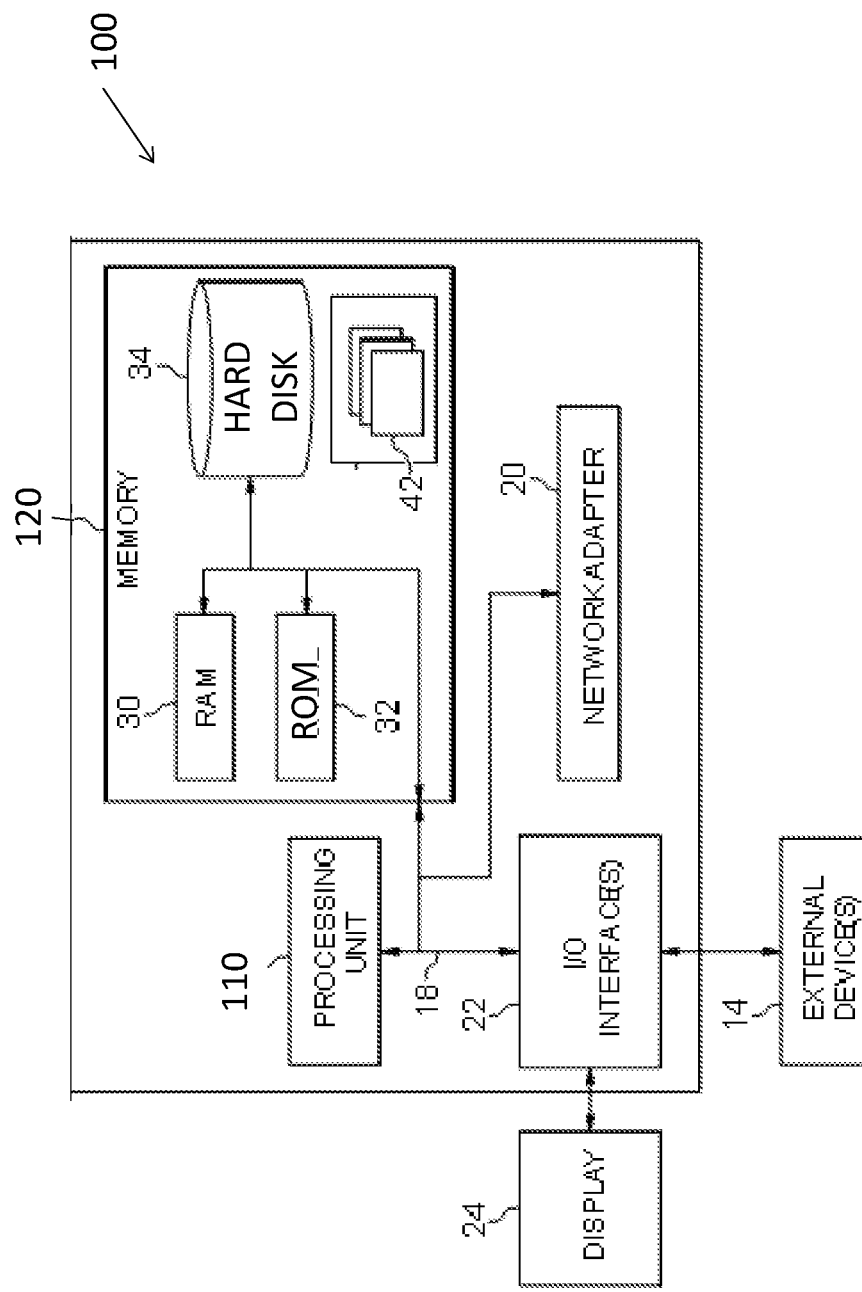
FIG. 5 is a block diagram of an exemplary processing system according to embodiments.

FIG. 1 is a block diagram of a set of processing systems 100-1 through 100-x (generally, 100) that perform distributed timing analysis of a partitioned chip design according to embodiments of the invention. Each processing system 100 includes processors 110a through 110n (generally, 110) and one or more memory devices 120. Together the processing systems 100 facilitate verification of the complete design of the integrated circuit and the resulting physical implementation of the integrated circuit 130. Each processing system 100 includes additional known components (e.g., input/output (I/O) interface 22, FIG. 5) that perform functions such as, for example, communication with the other processing systems 100. A processing system 100 may also include a display 24 (FIG. 5). Some of these components are further discussed with reference to FIG. 5 below. The multiple processors 110 of each processing system 100 are used to perform parallel processing of timing analysis tasks. An exemplary method of performing parallel processing of tasks is multi-threading. In the context of the embodiments herein, multi-threading refers to each timing analysis task (e.g., timing analysis of one node) being processed by a lightweight independent code stream known as a thread. Other exemplary methods of performing parallel processing of timing analysis tasks include message passing interfaces (MPIs) such as the MPI standard, as well as using heavyweight process forking. The memory device 120 stores instructions implemented by the processors 110. According to the embodiments detailed below, the memory device 120 additionally stores queues for the processing timing analysis tasks and segregates the queues as speculative and non-speculative (i.e., ready to process).

Figure 2:
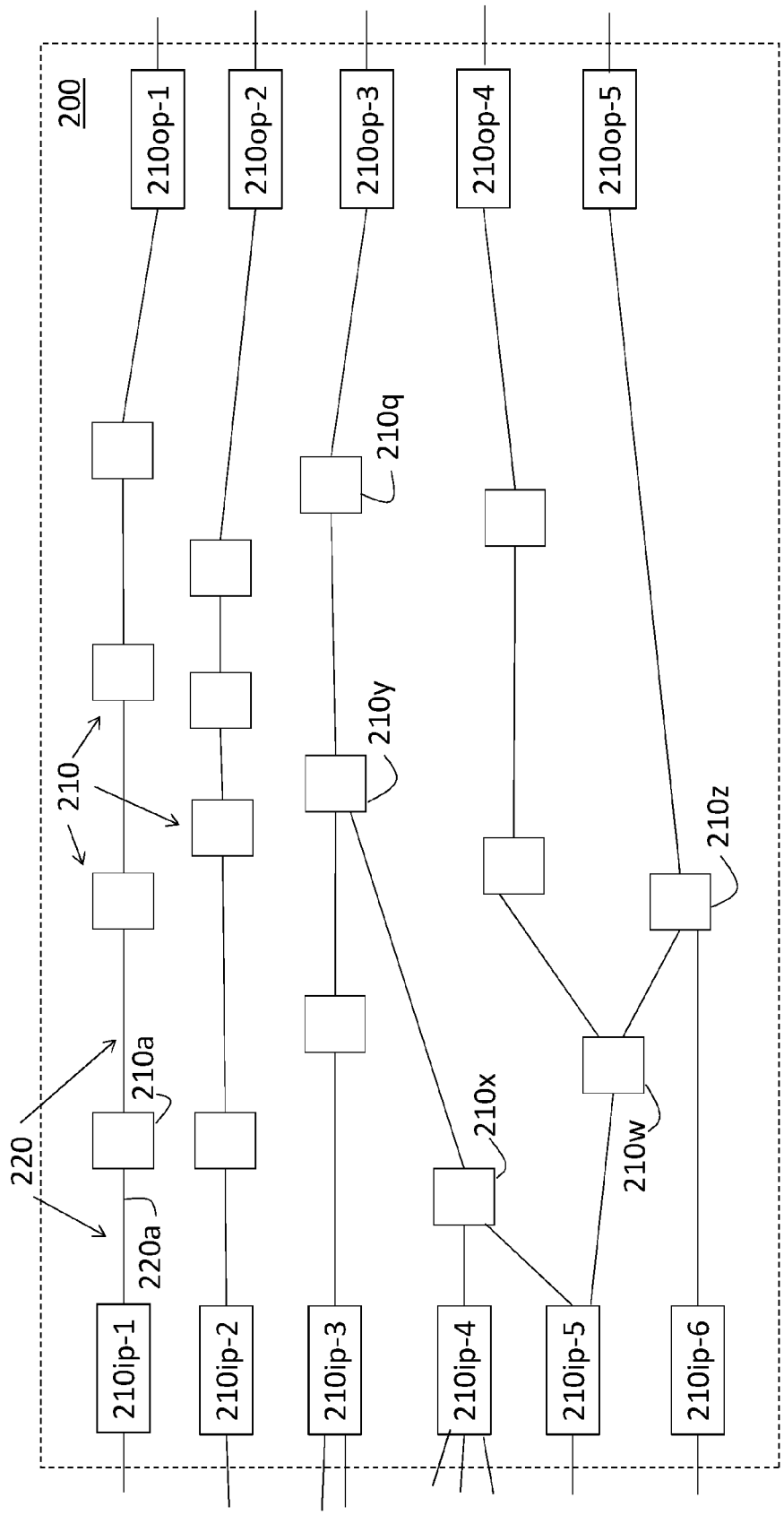
FIG. 2 shows an exemplary design partition whose timing is analyzed according to embodiments.

FIG. 2 shows an exemplary design partition 200 whose timing is analyzed according to embodiments of the invention. According to the embodiments detailed below, the design partition 200 is among a number of non-overlapping design partitions 200 that make up the full chip design. The exemplary design partition 200 includes six input nodes 210*ip*-1 through 210*ip*-6 and five output nodes 210*op*-1 through 210*op*-5 with various other nodes 210 in between. The labels input and output are used only for explanatory purposes to indicate that these nodes form the borders of the exemplary partition 200. Each node 210 represents a component such as a buffer or transistor, for example. Some of the nodes 210 between the input nodes 210*ip* and the output nodes 210*op* (i.e., nodes 210*a*, 210*q*, 210*w*, 210*x*, 210*y*, 210*z*) are additionally labeled for explanatory purposes. Nodes 210 are interconnected with edges 220 to form a path from each input node 210*ip* to an output node 210*op*. As FIG. 2 indicates, some nodes 210 have more than one input. Input nodes 210*ip*-1, 210*ip*-2, 210*ip*-5, and 210*ip*-6 each have one input, while input node 210*ip*-3 has two inputs, and input node 210*ip*-4 has three inputs. Nodes 210*x*, 210*y*, and 210*z* each have two inputs that originate at different input nodes 210*ip*. For example, the paths from both input nodes 210*ip*-4 and 210*ip*-5 are input to node 210*x*, and the output from node 210*x* then intersects with the path originating from node 210*ip*-3 at node 210*y*. Thus, the exemplary design partition 200 shown in FIG. 2 begins with nine paths, and, due to two of the nodes 210 providing two outputs, there are eleven paths through the exemplary design partition 200 altogether.

Timing analysis of each design partition 200 involves the determination of delay through each node 210 and edge 220 of each path from an input node 210*ip* to an output node 210*op*. This determination begins with the arrival time at the input of an input node 210*ip* (or, in a similar process in the case of back propagation, the required arrival time at an output node 210*op*). This arrival time at the input of an input node 210*ip* is added to the delay through the input node 210*ip* to determine the arrival time at the input of the edge 220 connecting the input node 210*ip* to the next node 210 in the path. The delay through the edge 220 is added to the arrival time at the input of the edge 220 to determine the arrival time at the input of the next node 210 and so on, until the output node 210*op* is reached. As noted above, the path delay determination for a given design portion 200 thus relies on output from one or more previous design portions 200, which provide the arrival time at each input node 210*ip* (except when the design portion 200 is the input portion of the entire chip design). The reliance on previous outputs leads to the sequential processing issue related to distributed timing analysis of a partitioned design as opposed to distributing the same complete design to different processing systems 100 and performing timing analysis for a different corner at each processing system 100, for example. The use of speculative and non-speculative processing to address the reliance of processing of a previous design partition 200 is detailed below.

Figure 3:
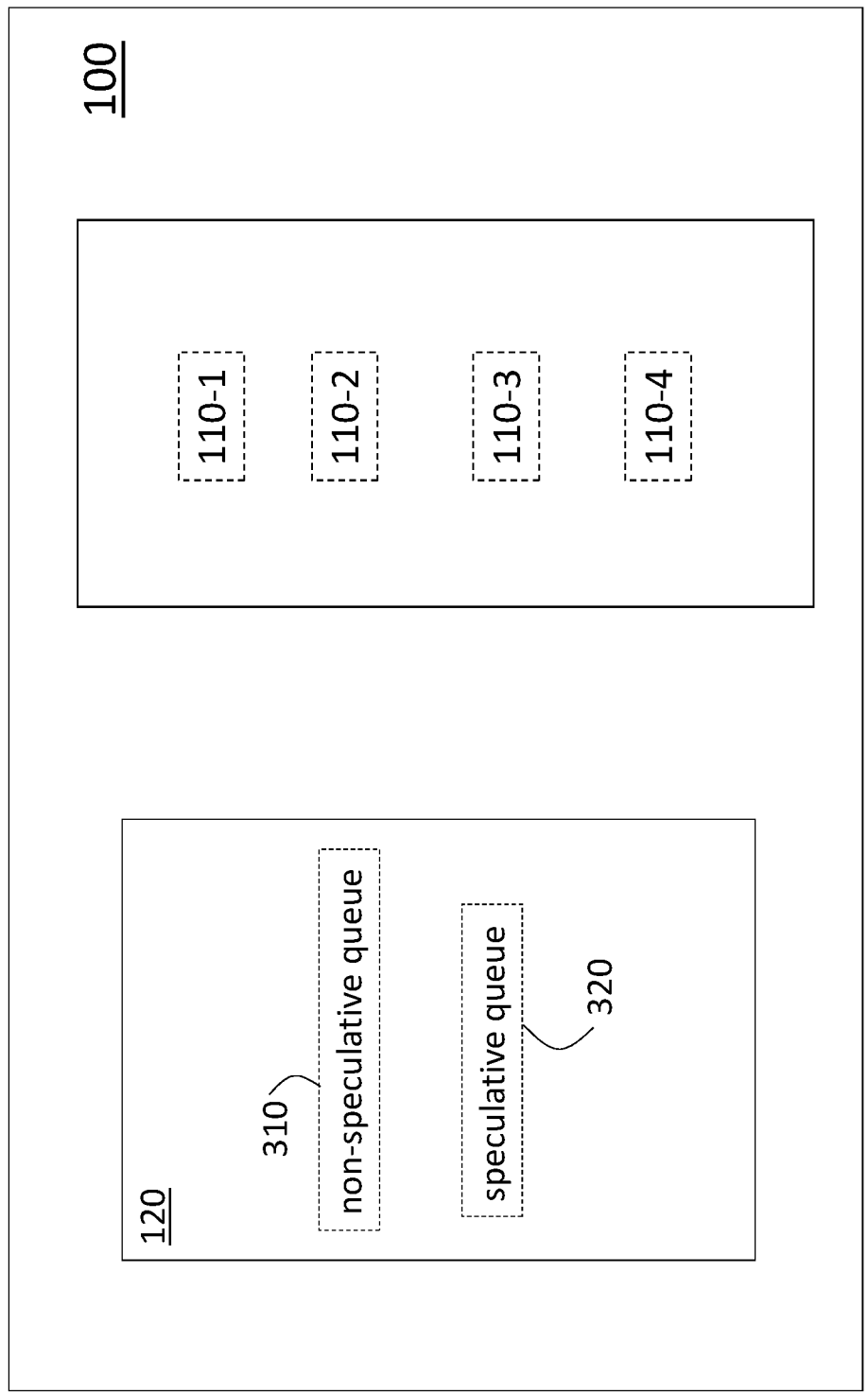
FIG. 3 is a block diagram of an exemplary processing system 100 according to an embodiment.

FIG. 3 is a block diagram of an exemplary processing system 100 according to an embodiment. The exemplary processing system 100 includes four processors 110-1 through 110-4. Thus, the exemplary processing system 100 can process four timing analysis tasks (i.e., timing analysis at four nodes 210) in parallel. The memory device 120 of the exemplary processing system 100 stores a speculative queue 320 and a non-speculative (or ready to process) queue 310. At each node 210, when all the inputs necessary to performing timing analysis of the node 210 are available, node 210 is moved to the non-speculative queue 310 to perform timing analysis. If, instead, only some of the inputs necessary to perform timing analysis of the node 210 are available, node 210 is moved to the speculative queue 320. The inputs at the input nodes 210ip may be received as messages from one or more processing systems 100 that are processing portions of the chip design that precede the design partition 200 that is processed by the exemplary processing system 100. Inputs needed to perform timing analysis include arrival time and slew. The inputs may include additional information (e.g., voltage waveform) associated with timing analysis, based on the level of accuracy of the timing analysis.

As one example, if the inputs for input node 210ip-1 are received, the input node 210ip-1 is moved to the non-speculative (i.e., ready to process) queue 310. The path from input node 210ip-1 to output node 210op-1 is a straightforward one, because only the inputs at the input node 210ip-1 needed to be received to complete the timing analysis of the entire path (all other subsequent inputs may be calculated). Thus, each node 210 along the path (each node in the path after input node 210ip-1) is moved to the non-speculative queue 310, in turn, following the processing of the preceding node 210. For example, once input node 210ip-1 is processed such that (based on the delay through the edge 220a) the inputs at node 210a are available, node 210a is moved to the non-speculative queue 310 and processed. Once this processing is done and the inputs at the next node 210 in the path are available, that next node 210 is moved to the non-speculative queue 310, and so forth.

As another example, if the inputs at input node 210ip-6 are received, the input node 210ip-6 is moved to the non-speculative queue 310 and processed. However, node 210z may be moved to the speculative queue 320 rather than the non-speculative queue 310 after the input node 210ip-6 is processed and inputs originating from input node 210ip-6 are available at node 210z. This is because node 210z has a second input originating from input node 210ip-5 that may not be available. Once both inputs at node 210z are available, node 210z is moved to the non-speculative queue 310.

When the number of nodes in the non-speculative queue 310 is equal to or greater than the number of processors 110 available in the processing system 100, then only the nodes 210 in the non-speculative queue 310 are processed. However, when the number of nodes 210 in the non-speculative queue 310 is less than the number of processors 110 available, then processing only the nodes 210 in the non-speculative queue 310 would result in what is referred to as worker starvation. That is, processors 110 would be left idle while waiting for inputs to be received so that more nodes 210 could be moved to the non-speculative queue 310. Yet, assuming a default or deriving input information from known information for one or more of the inputs (e.g., arrival time, slew) may result in no appreciable loss in accuracy. For example, performing timing analysis with default or derived inputs may result in 95% accuracy in the resulting delay and/or slew calculations. As the default or derived inputs are propagated through a path within the design partition 200, some of the nodes 210 may be completely unaffected by the inputs not being computed but, instead, derived or assumed. Thus, when processors 110 remain available after all the nodes 210 in the non-speculative queue 310 are assigned for processing, nodes 210 from the speculative queue 320 are processed according to embodiments further detailed below.

As noted above, when all the nodes 210 in the non-speculative queue 310 are being processed and processors 110 of the processing system 100 still remain available, then nodes 210 in the speculative queue 320 are processed according to embodiments. The nodes 210 in the speculative queue 320 may be associated with a confidence score such that, where there are more nodes 210 in the speculative queue 320 than there are processors 110 available, nodes 210 from the speculative queue 320 are selected for processing in order from highest to lowest confidence score. The confidence score may be given by:

$$\text{confidence\_score} = \frac{\text{\#completed\_inputs}}{\text{\#total\_inputs}} \quad [\text{EQ. 1}]$$

Thus, for example, at node 210y, if the inputs (e.g., arrival time, slew) associated with the path originating at input node 210ip-3 are complete but the inputs originating from node 210x are not yet computed, then the confidence score would be ½ or 50%. According to an alternate embodiment, nodes 210 in the speculative queue 320 may be selected according to lowest cost, where the cost of processing the nodes 210 is quantified by the number of edges 220 that are not yet ready.

Figure 4:
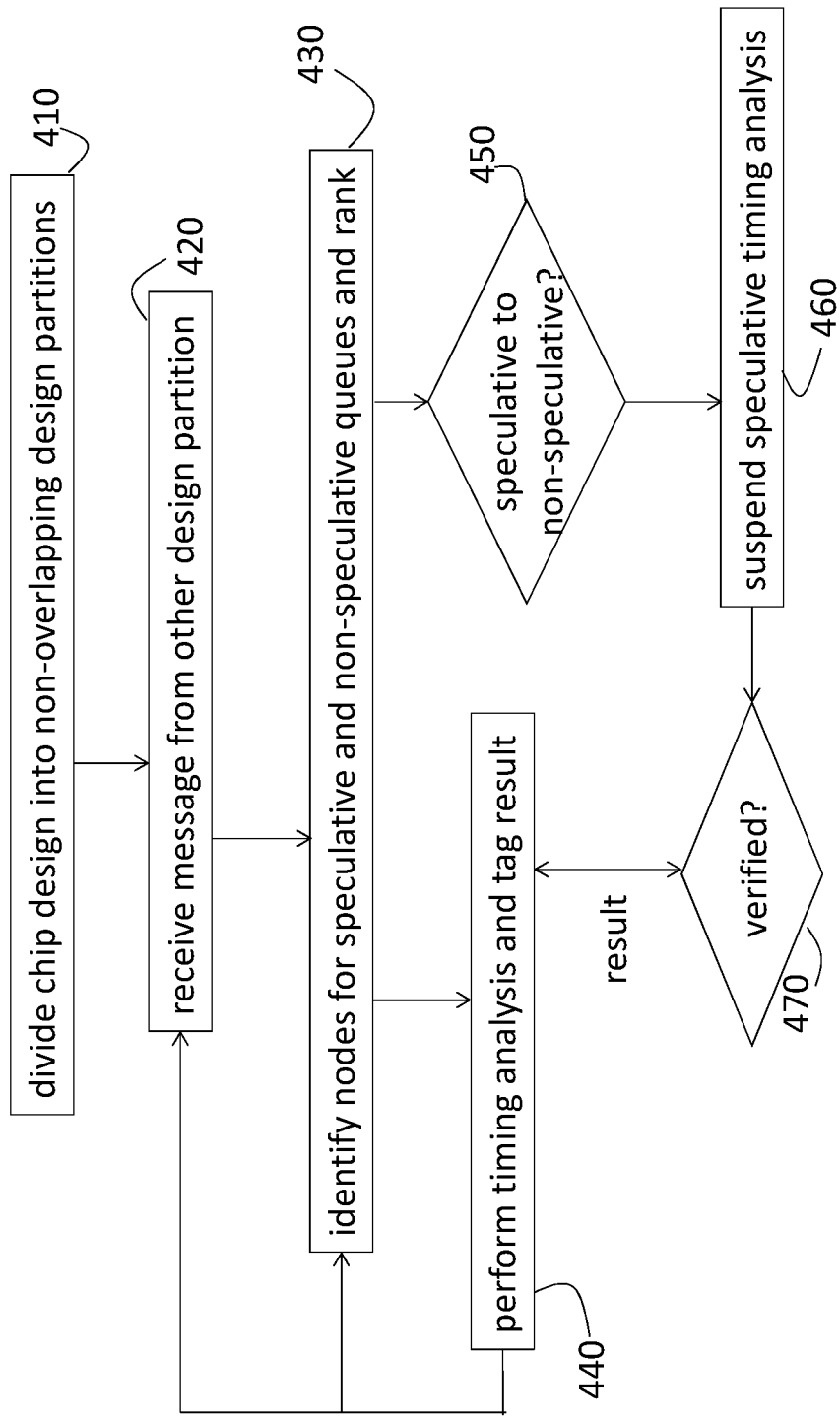
FIG. 4 is a process flow of a method of performing distributed timing analysis of a partitioned integrated circuit design according to embodiments.

FIG. 4 is a process flow of a method of performing distributed timing analysis of a partitioned integrated circuit design according to embodiments. At block 410, dividing the chip design into non-overlapping design partitions 200 includes processing each design partition 200 with a separate processing system 100. The remaining processes shown in FIG. 4 are performed at each processing system 100 for each design partition 200. Receiving a message from another design partition 200, at block 420, includes obtaining inputs at one or more of the input nodes 210ip. Based on the inputs in the message, identifying nodes 210 for the speculative queue 320 and the non-speculative queue 310 and ranking, at block 430, may be performed as discussed above. For example, if a message were received with inputs for input node 210ip-5, then the input node 210ip-5 would be added to the non-speculative queue 310. Performing timing analysis and tagging results, at block 440, includes processing all nodes 210 in the non-speculative queue 310 before any nodes 210 in the speculative queue 320, as noted above, and tagging the result of the timing analysis as being speculative or non-speculative. As FIG. 4 indicates, after performing timing analysis for a given node 210 and providing input to the next node 210, the processes at blocks 420 and 430 are repeated. Even if another message is not received (at block 420), the next node 210 or nodes 210 that received inputs based on the timing analysis performed in the previous cycle would now move to either the speculative queue 320 or the non-speculative queue 310. For example, after processing input node 210*ip*-5 (at block 440), node 210*w* would move to the non-speculative queue 310 (at block 430), and node 210*x* would move to either the non-speculative queue 310 or the speculative queue 320 (at block 430) based on whether the second set of inputs at node 210*x* (based on input node 210*ip*-4) were computed yet. To be clear, the addition of a node 210 to the speculative queue 320 or the non-speculative queue 310 may be triggered by a new message from another design partition 200 (at block 420) or by processing of a preceding node 210 (at block 440).

If the inputs based on input node 210*ip*-4 were already at node 210*x* (prior to input node 210*ip*-5 being processed) and node 210*x* had been processed as speculative, then the processing of input node 210*ip*-5 would result in a change in status for node 210*x* from speculative to non-speculative (at block 430). The check at block 450 would determine this change in status from speculative to non-speculative. Based on the change in status, suspending speculative timing analysis, at block 460, includes suspending the additional processing stemming from the timing analysis of node 210*x* from the speculative queue 320. That is, because the output of node 210*x* would have been tagged as speculative (at block 440), the output of subsequent nodes 210 in every path from node 210*x* would also be tagged as speculative. This processing as speculative would be suspended (at block 460) based on the change of status for node 210*x*. The previously obtained speculative results would then be verified, at block 470. Verification is discussed below with reference to node 210*y*.

An example of verification (at block 470) involves node 210*y*. If, initially, the inputs stemming from input node 210*ip*-3 were available at node 210*y* but the inputs stemming from node 210*x* were not available, then node 210*y* may be processed from the speculative queue 320. Further, the output of the timing analysis of node 210*y* would be tagged as speculative (at block 440) and provided to node 210*q*, whose output would also be tagged as speculative. Then, once the inputs stemming from node 210*x* were available at node 210*y*, node 210*y* would be moved to the non-speculative queue 310 (at block 430). At this point, based on determining the change in status (at block 450), the speculating timing analysis would be suspended (at block 460). Verification would entail re-analyzing nodes 210*y* and 210*q* using the now-known inputs stemming from node 210*x* and comparing the results with the results obtained by using default or derived values as part of the speculative processing. If the two results are within a threshold tolerance of each other, then the result is that the speculative processing is verified. Timing quantities that may be verified include arrival time, slew, delay, and required arrival time. Each of these values may be verified independently. For example, there may be cases in which delay and slew values obtained by speculative and non-speculative processing match (within the threshold tolerance), while arrival time or required arrival time values do not. The predetermined threshold tolerance is based on the order of magnitude of the delays in the chip design. That is, for example, most delays are on the order of picoseconds. Thus, the threshold tolerance for errors based on the speculative results may be on the order of a fraction of a picosecond. The result of the verification (at block 470) is provided, as indicated in FIG. 4. If the speculative results are verified, processing continues (at block 440) with the tags now changed to non-speculative. If the speculative results are not verified (at block 470), then processing begins anew at node 210*x* and the previously obtained results (tagged as speculative) may be discarded.

Because each of the parameters may be verified independently, only non-verified speculative values (e.g., arrival time, required arrival time, slew, delay) may be discarded. Thus, for example, if the delay and slew were verified, but the arrival time or required arrival time were not, then the previously (speculatively) computed arrival time or required arrival time values may be discarded while the previously computed delay and slew values are retained.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) (120) having computer readable program instructions thereon for causing a processor to carry out aspects of the present invention. An exemplary computer program product is discussed with reference to FIG. 5.

FIG. 5 is a block diagram of an exemplary processing system 100 according to embodiments. The computer readable storage medium (memory devices 120) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette 42, a hard disk 34, a random access memory (RAM) 30, a read-only memory (ROM) 32, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device (e.g., 14) via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card 20 or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method of performing distributed timing analysis of an integrated circuit design, the method comprising:

dividing the integrated circuit design into non-overlapping design partitions, each design partition including nodes and edges, each edge interconnecting a pair of the nodes;

identifying, for each design partition, speculative nodes among the nodes, each speculative node having at least one and less than all timing inputs available and being associated with a speculative processing task;

identifying, for each design partition, non-speculative nodes among the nodes, each non-speculative node having all timing inputs available and being associated with a non-speculative processing task;

assigning each of the non-speculative processing task to a respective processor of a processing system specific to each design partition for timing analysis processing prior to assigning any of the speculative processing tasks; and obtaining a physical implementation of an integrated circuit according to the integrated circuit design that results from the distributed timing analysis.

2. The computer-implemented method according to claim 1, further comprising ranking the speculative nodes.

3. The computer-implemented method according to claim 2, wherein the ranking the speculative nodes is based on a confidence score for each of the speculative nodes.

4. The computer-implemented method according to claim 2, wherein the ranking each of the speculative nodes is based on a cost associated with each of the speculative nodes given by a number of the one or more timing inputs not available for the speculative node.

5. The computer-implemented method according to claim 2, wherein the assigning each of the speculative processing tasks to the respective processor of the processing system is in an order based on the ranking of the associated speculative nodes.

6. The computer-implemented method according to claim 1, further comprising including a tag with an output of the timing analysis to indicate whether the timing analysis is associated with one of the speculative processing tasks or one of the non-speculative processing tasks.

7. The computer-implemented method according to claim 6, further comprising verifying the output of the timing analysis based on the tag indicating that the timing analysis is associated with one of the speculative processing tasks.

8. A system to perform timing analysis of a design partition of an integrated circuit design, the system comprising:

a memory device configured to store the design partition of the integrated circuit design, a plurality of the design partitions representing non-overlapping portions of the integrated circuit design and the design partition including nodes and edges, each edge interconnecting a pair of nodes; and one or more processors configured to identify speculative nodes among the nodes, each speculative node having at least one and less than all timing inputs available and being associated with a speculative processing task, identify non-speculative nodes among the nodes, each non-speculative node having all timing inputs available and being associated with a non-speculative processing task, and perform timing analysis of the non-speculative processing tasks prior to performing timing analysis of any of the speculative processing tasks, wherein each of the one or more processors processes one of the speculative processing tasks or one of the non-speculative processing tasks at a time, wherein a physical implementation of an integrated circuit is obtained according to the integrated circuit design that results from the timing analysis.

9. The system according to claim 8, where the one or more processors ranks the speculative nodes.

10. The system according to claim 9, wherein the one or more processors ranks the speculative nodes based on a confidence score for each of the speculative nodes.

11. The system according to claim 9, wherein the one or more processors rank the speculative nodes based on a cost associated with each of the speculative nodes given by a number of the one or more timing inputs not available for the speculative node.

12. The system according to claim 9, wherein the one or more processors perform timing analysis of speculative processing tasks in an order based on the rank of the associated speculative node.

13. The system according to claim 8, wherein the one or more processors include a tag with an output of the timing analysis to indicate whether the timing analysis is associated with one of the speculative processing tasks or one of the non-speculative processing tasks.

14. The system according to claim 13, wherein the one or more processors verify the output of the timing analysis based on the tag indicating that the timing analysis is associated with one of the speculative processing tasks.

15. A computer program product for performing timing analysis of a design partition of an integrated circuit design, the design partition representing a portion of the integrated circuit design and including nodes and edges, each edge interconnecting a pair of the nodes, the computer program product comprising a computer readable storage medium having program instructions embodied therewith, the program instructions executable by one or more processors to perform a method comprising:

identifying speculative nodes among the nodes, each speculative node having at least one and less than all timing inputs available and being associated with a speculative processing task;

identifying non-speculative nodes among the nodes, each non-speculative node having all timing inputs available and being associated with a non-speculative processing task; and assigning each of the non-speculative processing tasks to a respective processor among the one or more processors for timing analysis processing prior to assigning any of the speculative processing tasks, wherein physical implementation of an integrated circuit is obtained according to the integrated circuit design that results from the timing analysis.

16. The computer program product according to claim 15, further comprising ranking the speculative nodes, wherein the assigning each of the speculative processing tasks to the respective processor of the processing system is in an order based on the ranking of the associated speculative nodes.

17. The computer program product according to claim 16, wherein the ranking the speculative nodes is based on a confidence score for each of the speculative nodes.

18. The computer program product according to claim 16, wherein the ranking each of the speculative nodes is based on a cost associated with each of the speculative nodes given by a number of the one or more timing inputs not available for the speculative node.

19. The computer program product according to claim 15, further comprising including a tag with an output of the timing analysis to indicate whether the timing analysis is associated with one of the speculative processing tasks or one of the non-speculative processing tasks.

20. The computer program product according to claim 19, further comprising verifying the output of the timing analysis based on the tag indicating that the timing analysis is associated with one of the speculative processing tasks.

* * * * *